US011240256B2

(12) United States Patent
Bania et al.

(10) Patent No.: US 11,240,256 B2
(45) Date of Patent: Feb. 1, 2022

(54) GROUPING ALERTS INTO BUNDLES OF ALERTS

(71) Applicant: HEWLETT PACKARD ENTERPRISE DEVELOPMENT LP, Houston, TX (US)

(72) Inventors: Tomasz Jaroslaw Bania, Mountain View, CA (US); William G. Horne, Lawrenceville, NJ (US); Renato Keshet, Haifa (IL); Pratyusa K. Manadhata, Piscataway, NJ (US); Manish Marwah, Palo Alto, CA (US); Brent James Miller, Raleigh, NC (US); Barak Raz, Tel Aviv (IL); Tomas Sander, New York, NY (US)

(73) Assignee: Micro Focus LLC, Santa Clara, CA (US)

( * ) Notice: Subject to any disclaimer, the term of this patent is extended or adjusted under 35 U.S.C. 154(b) by 869 days.

(21) Appl. No.: 15/420,417

(22) Filed: Jan. 31, 2017

(65) Prior Publication Data
US 2018/0219875 A1    Aug. 2, 2018

(51) Int. Cl.
*G06F 21/00*    (2013.01)
*H04L 29/06*    (2006.01)

(52) U.S. Cl.
CPC .......... *H04L 63/14* (2013.01); *H04L 63/1416* (2013.01); *H04L 63/1425* (2013.01); *H04L 63/20* (2013.01)

(58) Field of Classification Search
None
See application file for complete search history.

(56) References Cited

U.S. PATENT DOCUMENTS

| 7,624,448 | B2 | 11/2009 | Coffman |
| 8,739,290 | B1 | 5/2014 | Jamail et al. |
| 9,064,210 | B1 | 6/2015 | Hart |
| 9,306,962 | B1 | 4/2016 | Pinto |
| 2002/0099579 | A1* | 7/2002 | Stowell ............ G06Q 10/06393 705/7.39 |
| 2002/0099598 | A1* | 7/2002 | Eicher, Jr. ............ G06Q 10/087 705/28 |
| 2004/0177053 | A1* | 9/2004 | Donoho ................. G06Q 40/00 706/47 |
| 2007/0209074 | A1 | 9/2007 | Coffman |
| 2008/0307525 | A1 | 12/2008 | Nickle |
| 2012/0072983 | A1* | 3/2012 | McCusker ............ H04L 63/126 726/22 |

(Continued)

OTHER PUBLICATIONS

Birnbaum, Zachary et al. Unmanned Vehicle Security Using Behavioral Profiling. 2015 International Conference on Unmanned Aircraft Systems (ICUAS). https://ieeexplore.ieee.org/stamp/stamp.jsp?tp=&arnumber=7152425 (Year: 2015).*

(Continued)

*Primary Examiner* — Jeremiah L Avery (57) ABSTRACT

In some examples, a plurality of alerts relating to issues in a computing arrangement are received, where the plurality of alerts generated based on events in the computing arrangement. A subset of the plurality of alerts is grouped into a bundle of alerts, the grouping being based on a criterion. The bundle of alerts is communicated to cause processing of the alerts in the bundle of alerts together.

19 Claims, 3 Drawing Sheets

(56) References Cited

U.S. PATENT DOCUMENTS

| | | | |
|---|---|---|---|
| 2013/0024937 A1* | 1/2013 | Glew | G06F 21/577 726/23 |
| 2013/0024939 A1* | 1/2013 | Glew | G06F 21/577 726/24 |
| 2013/0081134 A1* | 3/2013 | Glew | G06F 21/552 726/22 |
| 2013/0217332 A1* | 8/2013 | Altman | H04W 4/025 455/41.2 |
| 2014/0337086 A1* | 11/2014 | Asenjo | H04L 41/0896 705/7.28 |
| 2015/0081885 A1 | 3/2015 | Thomas et al. | |
| 2015/0106867 A1 | 4/2015 | Liang | |
| 2015/0163242 A1 | 6/2015 | Laidlaw et al. | |
| 2015/0264077 A1 | 9/2015 | Berger et al. | |
| 2016/0050225 A1 | 2/2016 | Carpenter et al. | |
| 2016/0080502 A1 | 3/2016 | Yadav | |
| 2016/0164893 A1 | 6/2016 | Levi | |
| 2016/0352759 A1 | 12/2016 | Zhai | |
| 2017/0032463 A1* | 2/2017 | Hunter | G06Q 40/04 |
| 2017/0063709 A1 | 3/2017 | Smith | |
| 2017/0116581 A1* | 4/2017 | Shah | G06Q 10/1097 |
| 2017/0126523 A1 | 5/2017 | Chen | |
| 2017/0220651 A1* | 8/2017 | Mathew | G06F 16/248 |
| 2017/0251013 A1 | 8/2017 | Kirti | |
| 2018/0091528 A1 | 3/2018 | Shahbaz | |

OTHER PUBLICATIONS

Loubna, Cherrat et al. Data extraction for user profile management based on behavior. 2015 International Conference on Cloud Technologies and Applications (CloudTech). https://ieeexplore.ieee.org/stamp/stamp.jsp?tp=&arnumber=7336972 (Year: 2015).*

Manage Engine, "EventLog Analyzer is an IT Compliance & Log Management Software for SIEM", Dec. 19, 2016, Zoho Corp., 4 pages.

Prelude, "Prelude—a Cs Product", 2016, Available at: <prelude-siem.org/projects/prelude>, 1 page.

Efflux Analytics, "Security Automation is Here," Nov. 2, 2015, 8 pages.

Hexadite, "Cyber analyst thinking at the speed of automation", Jan. 6, 2017, 15 pages.

HPE, "Hewlett Packard Enterprise Unveils Foundation for Next-Generation Intelligent Security Operations", Sep. 14, 2016, 6 pages.

Karim Al-Saedi et al. "Research Proposal:An Intrusion Detection System Alert Reduction and Assessment Framework Based on Data Mining", Journal of Computer Science, 2013, 6 pgs.

Manadhata et al., U.S. Appl. No. 15/420,521 entitled Responding to Alerts, filed Jan. 31, 2017, 26 pages.

Marwah et al., U.S. Appl. No. 15/420,420 entitled Determining Contextual Information for Alerts, filed Jan. 31, 2017, 26 pages.

Tirath Singh, "An Effective Approach for Building Your Security Operations Center and Taking It to the Next Level", 2015, White Paper, Tata Consultancy Services Ltd., 13 pages.

* cited by examiner

GROUPING ALERTS INTO BUNDLES OF ALERTS

BACKGROUND

A computing arrangement, which can include a network of computers and other types of devices, can be subject to unauthorized access or attack. Unauthorized access can be performed by users or programs. Attacks can include attacks by malware, denial-of-service attacks, and so forth. Other anomalies or issues can also exist in a computing arrangement.

BRIEF DESCRIPTION OF THE DRAWINGS

Some implementations of the present disclosure are described with respect to the following figures.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Security issues in a computing arrangement can relate to any or some combination of the following activities: unauthorized access of data, a program, or machine in the computing arrangement; an attack on the computing arrangement that is intended to cause damage or errors in components of the computing arrangement; an action that violates a specified policy, government regulation, or standards specification; fault or error during operation of a program or machine; or any other activity that can compromise the security or operational integrity of the computing arrangement. The foregoing activities can occur as a result of a user performing an unauthorized login or access of the computing arrangement, either from within a boundary of the computing arrangement or from outside the boundary of the computing arrangement, execution of malware (e.g., viruses, adware, spyware, etc.) in the computing arrangement, denial-of-service (DoS) attacks, malfunctioning programs or machines, or other activities.

A "computing arrangement" can refer to any arrangement that includes any or some combination of the following, whether at one geographic location or at multiple geographic locations: a computer (or alternatively, multiple computers), a communication node (or alternatively, multiple communication nodes), a storage device (or alternatively, multiple storage devices), a printer (or multiple printers), a server (or multiple servers), and other electronic devices. A "boundary" of the computing arrangement can be provided by systems at the edge of a network that allow electronic devices in the computing arrangement to communicate with external devices. For example, such edge systems can include any or some combination of the following: firewalls, gateways, network address translators, routers, switches, and so forth.

An enterprise can establish a security operation center (SOC) to protect the computing arrangement from security issues. An enterprise can refer to a business concern, a government agency, an educational organization, or any other entity that has a computing arrangement.

An SOC can refer to any entity (such as a department, a division, or any other organizational unit) that is responsible for protecting the computing arrangement in response to security issues. In an SOC, analysts may monitor for alerts relating to security issues in the computing arrangement, and in response to the alerts, can take actions to address the security issues.

In some examples, security alerts can be generated by a security information and event management (SIEM) system, which can refer generally to an infrastructure, made up of hardware equipment and machine-readable instructions (software and/or firmware), that is able to collect data relating to events in the computing arrangement, and to generate security alerts in response to the collected event data.

Although reference is made to security alerts in some examples, it is noted that in other examples, solutions according to some implementations can be applied to other types of alerts relating to other issues that may be present in a computing arrangement, where such issues can affect the performance of the computing arrangement or can cause the computing arrangement to exhibit errors or violate policies, rules, and so forth.

Traditionally, analysts of an SOC can perform manual investigations to respond to alerts. For example, in response to an alert, the manual investigation performed by a human analyst can include collecting more information to make sense of the alert, and to determine whether or not the alert relates to a true positive (i.e., the alert correctly indicated that a security issue has occurred) or a false positive (i.e., the alert incorrectly indicated that a security issue has occurred). The investigation can further involve hypothesis generation (to generate a hypothesis regarding why the alert occurred) and testing the hypothesis to determine if the hypothesis is correct. If the wrong hypothesis is proffered, then the analyst may have to back up and try a new hypothesis, which can be time consuming and labor intensive.

In some cases, similar alerts can result in duplicate effort to address the alerts. Such similar alerts may involve similar investigations and remediation actions to address them. If the similar alerts are processed by the same analyst, the analyst's assignment can be quite tedious as the analyst is doing the same (or similar) work multiple times. Also, this duplicated effort is wasteful of resources. In addition, an analyst (or multiple analysts) may miss that multiple alerts may relate to the same cause. Moreover, keeping up with a large number of alerts can be challenging, and can place great stress on personnel and other resources of an SOC.

In accordance with some implementations of the present disclosure, automated solutions are provided to bundle alerts that are generated from events. Each alert can be generated in response to an event (or alternatively, a collection of events). An alert can refer to a notification that is communicated to indicate that an issue (such as a security issue) may be present in a computing arrangement, and that such issue may have to be addressed. The notification may be in the form of a message, an information element, a document, or any other indication that can be communicated from a first entity to a second entity for the purpose of notifying the second entity that some issue is present that may have to be addressed. An entity can refer to a machine, a program, or a human. The bundling of alerts can be based on a grouping criterion. From a larger set of alerts, the grouping criterion can be used to select a subset of the alerts in the larger set, and the alerts in the subset are included into a bundle of alerts. The bundle of alerts can be communicated to cause performance of a process to address the issues associated with the alerts.

Figure 1:
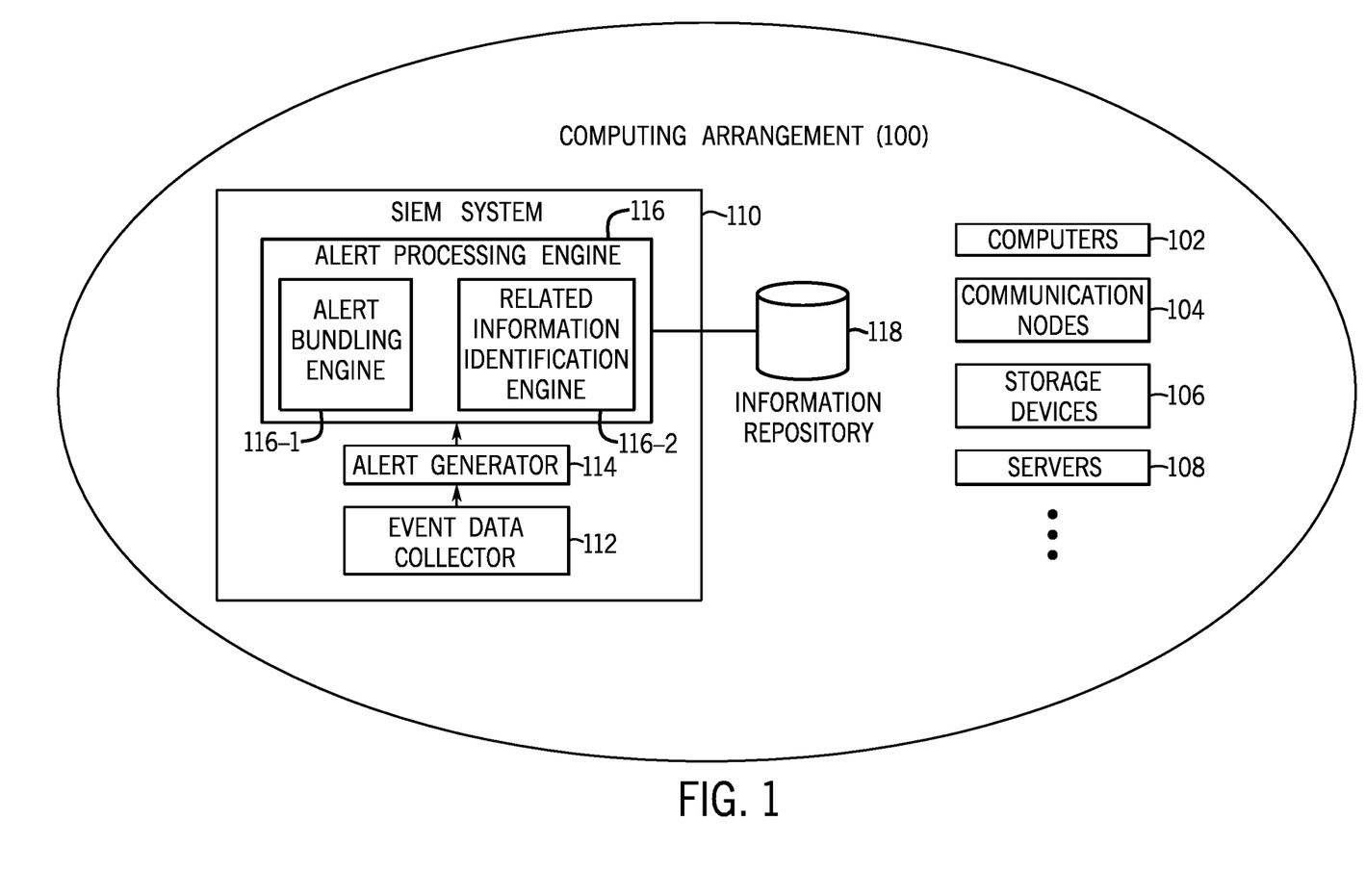
FIG. 1 is a block diagram of a computing arrangement according to some examples.

FIG. 1 is a block diagram of an example computing arrangement 100, which includes computers 102, communication nodes 104, storage devices 106, servers 108, and other types of electronic devices. The computing arrangement 100 can be a data center, an information technology (IT) infrastructure, or any other type of arrangement that includes electronic devices.

The computing arrangement 100 also includes a security information and event management (SIEM) system 110, which includes an event data collector 112 to collect data relating to events associated with the various electronic devices of the computing arrangement 100. For example, events can include login events, events relating to loading of programs, events relating to execution of programs, events relating to accesses made of components of the computing arrangement 100, errors reported by machines or programs, events relating to performance monitoring of various characteristics of the computing arrangement 100, including monitoring of network communication speeds, execution speeds of programs, and so forth.

Event data collected by the event data collector 112 can include attributes associated with each event, where attributes can include any or some combination of the following: an entity (machine or program) associated with the event (e.g., the entity that triggered the event, the entity on which an activity was occurring when the event occurred, etc.), a type of operating system associated with the event, a type of application program associated with the event, a network address associated with the event, and so forth.

The event data collector 112 provides the collected event data to an alert generator 114. The alert generator 114 can apply specified rules or policies to determine whether or not, based on an event or a collection of events represented by the collected event data, a corresponding security alert is to be generated. A security alert produced by the alert generator 114 can be provided to an alert processing engine 116 according to some implementations of the present disclosure.

The alert processing engine 116 includes an alert bundling engine 116-1 to group alerts that are similar to each other into a bundle of alerts, and a related information identification engine 116-2 to identify related information pertaining to a bundle of alerts. The identified related information can include information that is in addition to information of the alerts, where the related information can provide a context for the bundle of alerts in some examples.

As used here, an engine can be implemented using a computer or a number of different computers. More generally, an engine can include a processor and a storage medium storing instructions that upon execution on the processor cause the processor to perform various tasks. Executing instructions on a processor can refer to executing the instructions on one processor, or executing the instructions on multiple processors.

The bundle of alerts produced by the alert bundling engine 116-1 and the related information identified by the related information identification engine 116-2 can be sent to a human analyst or to an automated system (or more generally a target entity) to process the bundle of alerts together. The target entity receiving the bundle of alerts and the related information can consider the alerts of the bundle as a group, rather than the alerts individually. By being able to process the bundle of alerts together, more efficient alert processing can be performed by the target entity, particularly when there are a very large number of alerts that can be reduced by bundling such alerts into bundles.

The alert bundling engine 116-1 uses a grouping criterion to select a subset of alerts from a larger set of alerts to include in a bundle. The following describes examples of grouping criteria that can be used. Note that the following describes examples of individual grouping criteria. In further examples, a grouping criterion can include a combination of any of the grouping criteria discussed below.

As noted above, each alert is associated with a corresponding event or a collection of events; in other words, the event or collection of events when detected triggers the generation of the alert by the alert generator 114. An example grouping criterion can be based on similarity of the underlying events for the alerts that are received by the alert bundling engine 116-1 (more generally "received alerts"). Similarity of events can be based on the comparison of the events associated with the received alerts. For example, two alerts can be considered to be similar if they share a common event or a common set of events. As a specific example, if alert 1 is triggered in response to events A, B, and C, and alert 2 is triggered in response to events B, C, and D, alerts 1 and 2 can be determined to be similar in response to detecting that the alerts share common events B and C. More generally, two alerts are considered to be similar if they share more than a specified number of events, or alternatively, if the number of events they have in common makes up more than a specified percentage of events associated with the alerts.

Alternatively, similarity of events associated with the alerts can be based on the comparison of the attributes of the events. Each event can include a number of attributes, and the comparison of the attributes of the events can involve computing a distance function that includes a sum of the difference of the attributes (or a sum of the square of the differences of the attributes), where this distance function can provide an indication of how similar two events are. The similarity value provided by the distance function can be compared to a threshold, and based on this comparison, a determination is made regarding whether the events are similar. If the underlying events for respective alerts are similar, then an indication can be provided that the alerts are similar.

In other examples, a grouping criterion can be based on a similarity of behavioral profiles of respective received alerts. A behavioral profile can refer to a behavior of some measure (or collection of measures) that represents an anomaly corresponding to an alert. For example, a measure can indicate a number of Hypertext Transfer Protocol (HTTP) connections made to the servers 108 of the computing arrangement 100. Thus, an anomaly corresponding to a first alert can exhibit a spike in the number of HTTP connections that is similar to a spike of the number of HTTP connections represented by a second alert (e.g., the spikes in the number of HTTP connections has similar amplitudes and similar time durations, and occur within a specified time interval of one another). Amplitudes are similar to each other if the amplitudes are within a specified value of one another, and time durations are similar to each other if the time durations are within a specified value of one another.

More generally, the behavioral profiles of alerts are considered to be similar in response to a determination that a profile of a measure (or collection of measures) of one alert is similar to a profile of a measure (or collection of measures) of another alert. Each profile of a measure includes a variation of values of the measure as a function of a variable, such as time, physical location, and so forth. Note that a "behavioral profile" can refer to an actual object in a computing system, or any other information (or collection of information) that represents such profile.

The similarity in the behavioral profiles corresponding to these alerts can provide an indication that the alerts are related to the same attack being made on the computing arrangement 100, such as a distributed denial-of-service attack.

Another example of a grouping criterion can include similarity of criticalities of assets impacted by respective received alerts. An asset can refer to a machine or a program. The criticality of an asset refers to how important the asset is to an organization (e.g., a company, a government agency, an educational organization, etc.). The organization can assign indicators of criticality to respective assets, and these indicators of criticality can be stored in a list or other data structures. The alert bundling engine 116-1 is able to consult this list (or other data structure) that includes indicators of criticality, and the indicators of criticalities of different assets impacted by received alerts can be compared to determine similarity of the alerts. For example, alerts can be considered to be similar to one another if the criticality of an asset (or assets) impacted by a first alert is similar to (within a specified range of) the criticality of an asset (or assets) impacted by a second alert.

In other examples, a criticality of an asset can be determined using a rule, where the rule can specify a criticality based on an underlying factor (or group of factors). One such factor is the role of an owner of each asset. An asset is owned by a person if there is actual ownership of the asset or if the asset is assigned for use by the person (even though the asset is actually owned by another entity).

As an example, if the owner of the asset is an executive in an organization, then the application of the rule can produce a higher criticality value. As another example, if the owner of the asset is an intern, then the application of the rule can produce a lower criticality value.

Another example factor that can be considered by a rule in determining criticality is the type of data stored on the asset. For example, if the type of data stored on the asset includes sensitive data, such as personal information of employees of the organization, trade secret information, or other sensitive business information, then the rule applied by the alert bundling engine 116-1 can produce a higher criticality value.

Another example of a grouping criterion that can be used is similarity of analytics modules that generated the respective alerts. In FIG. 1, the alert generator 114 can include multiple analytics modules that receive event data from different sources or different groups of sources. Alternatively, the different analytics modules of the alert generator 114 can apply different rules or policies for determining whether or not an alert is to be produced in response to an event (or a collection of events). For example, one analytics module may be used by a first department of an organization, while another analytics module may be used by another department of the organization. In further examples, the events of multiple different organizations (e.g., different companies) can be monitored by the SIEM system 110, in which case the alert generator 114 can include different analytics modules for the different organizations.

Similarity of analytics modules can be based on whether the analytics modules apply the same rule or policy (or group of rules or policies) to generate an alert. Two alerts are deemed to be similar if the analytics modules used to produce the respective two alerts apply the same or similar rule or policy, for example. Rules or policies are considered to be similar to one another based on a comparison of the rules or policies to determine what they have in common. For example, a first rule and a second rule (applied by respective first and second analytics modules) that both specify that an alert is to be generated in response to an excessive number of login attempts within a time duration can be considered to be similar rules, and thus the respective first and second analytics modules can be considered similar.

Another example of a group criterion can relate to similarity of indicators of compromise (IOCs) associated with the respective alerts. An IOC can include an artifact that indicates compromise of a computing arrangement, such as intrusion into the computing arrangement 100. For example, the artifact of an IOC can include any or some combination of the following features: a malware signature, an Internet Protocol (IP) address relating to a program or machine that is likely to cause compromise of the computing arrangement 100, hashes of files of malware, uniform resource locators (URLs) or domain names, and so forth. Received alerts can be associated with IOCs. For example, when an alert is generated by the alert generator 114 in response to events, the alert generator 114 can collect information of an artifact (such as any of the foregoing information) and can associate such collected information of the artifact with the alert. A comparison of the IOCs associated with the received alerts can be used to determine similarity of the received alerts. For example, received alerts are considered to be similar if the IOCs share a common artifact (e.g., the same malware signature, the same IP address or IP addresses, etc.).

Another example of a grouping criterion can relate to a peer group criterion, where a peer group is a predefined group of members (e.g., a group of humans, a group of machines, a group of programs, etc.). An organization can define this peer group of members, and if received alerts affect members of this peer group, then the alert bundling engine 116-1 can determine that the received alerts are similar.

In further examples, the grouping criterion can further include any one or some combination selected from among the following:
similarity of targets (e.g., users, machines, programs) affected by respective alerts,
similarity of sources (e.g., users, machines, programs) of respective alerts,
similarity of attributes of users affected by or causing respective alerts,
similarity of features of respective alerts,
similarity of timings of respective alerts, and
similarity of analyst-defined tags of respective alerts.

Targets and sources can be deemed to be similar based on a comparison (such as by using a distance function) of attributes of the targets or sources, where the attributes can include an IP address of the target or source, a port number of the target or source, a host name of the target or source, an asset type of the target or source, a user that owns the target or source, and so forth.

Attributes of users can include a job function of the user, a location of the user, a department for which the user works, and so forth. The attributes of users can be compared (such as by using a distance function) to determine their similarity.

Features of an alert can include any or some combination of the following: a hash of a file containing information of the alert, a process name associated with the alert, a mutex of the alert, and so forth. The features of alerts can be compared (such as by using a distance function) to determine their similarity.

A timing of an alert can refer to a time window or a time sequence in which the alert occurs. Timings of respective alerts are considered to be similar if they overlap by some specified amount or by some specified percentage of an overall time duration.

Analyst-defined tags can include information (in the form of tags) produced by an analyst (or multiple analysts), where the tags are associated with alerts. Similarity of the tags can be determined based on a comparison (such as by using a distance function) of the tags.

The related information identification engine 116-2 can identify related information to be communicated with the bundle of alerts produced by the alert bundling engine 116-1, to help an SOC in performing a process (e.g., investigation) to address issues associated with the bundle of alerts. The related information identification engine 116-2 can identify related information based on any one or some combination of the following factors (referred to generally as a related information identification criterion): a specification of an extent of historical data to search (e.g., how far back in time the search should be performed in the historical data), a type of information to be returned (e.g., alerts, IOCs, anomalies, past processes, etc.), features used to determine similarity of alerts, a type of alert in the bundle of alerts, a criticality of an alert in the bundle of alerts, an asset affected by an alert in the bundle of alerts, a category to which the bundle of alerts belong, and presence of an alert from another security tool.

The historical data, which can be maintained in an information repository 118 depicted in FIG. 1, can store information of past processes (e.g., investigations) that have been performed in response to alerts, and can also store the alerts associated with such processes. An information repository 118 can be implemented as a collection of information stored on a storage device or a collection of storage devices.

The related information identification engine 116-2 can access the information of the past processes to identify which past processes are applicable to alerts in the bundle of alerts produced by the alert bundling engine 116-1. For example, the related information identification engine 116-2 can compare the bundle of alerts with past alerts referred to by the historical data, and can retrieve information of past processes for past alerts that are determined to be similar. The related information identification engine 116-2 can search the historical data that goes back in time to some specified extent.

The historical data maintained by the information repository 118 can also store various different types of information, such as information of past processes, information regarding alerts, IOCs, information about anomalies, and so forth. A factor to be used to determine what related information is to be returned by the related information identification engine 116-2 can be the type or types of information to return, including any of the foregoing.

As noted above, other factors (part of the related information identification criterion) to be considered by the related information identification engine 116-2 in determining the related information to identify can include a type of alert in the bundle of alerts (the related information identified is related to the type of alert), a criticality of an alert in the bundle of alerts (the related information identified pertains to another alert having a similar criticality), an asset affected by an alert in the bundle of alerts (the related information identified pertains to this asset), a category to which the bundle of alerts belong (the related information identified pertains to this category), and presence of an alert from another security tool (the related information identified pertains to information relating to the security tool).

Figure 2:
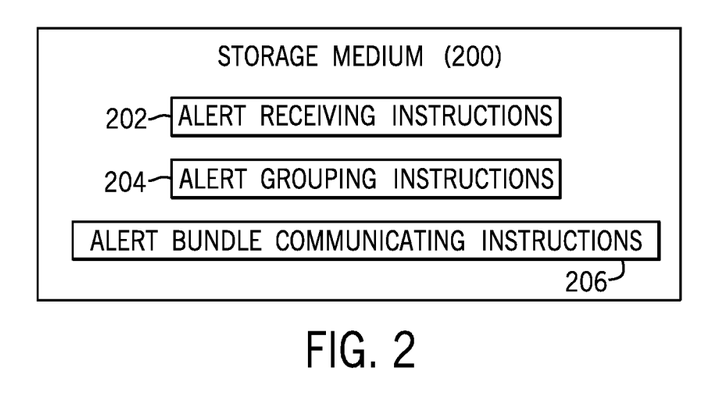
FIG. 2 is a flow diagram of a process of an alert bundling engine according to some examples.

FIG. 2 is a block diagram of a non-transitory machine-readable or computer-readable storage medium 200 that stores machine-readable instructions, such as instructions of the alert bundling engine 116-1. The machine-readable instructions stored in the storage medium 200 include alert receiving instructions 202 to receive multiple alerts relating to issues in the computing arrangement 100, where the multiple alerts are generated based on events in the computing arrangement 100. The machine-readable instructions further include alert grouping instructions 204 to group a subset of the multiple alerts into a bundle of alerts, where the grouping is based on a grouping criterion. The machine-readable instructions further include alert bundle communicating instructions 206 to communicate the bundle of alerts to cause processing of the alerts in the bundle of alerts together. Processing the alerts in the bundle together refer to either a system or an analyst considering the alerts as a group, rather than the alerts individually.

Figure 3:
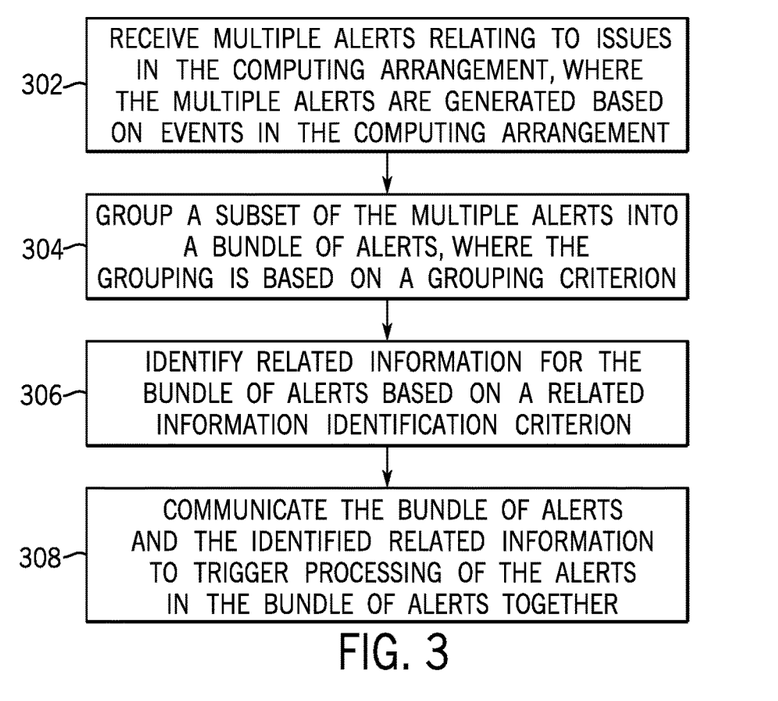
FIG. 3 is a block diagram of a storage medium storing machine-readable instructions for bundling alerts, according to some examples.

FIG. 3 is a flow diagram of a process according to some examples, where the process can be performed by the alert bundling engine 116-1 and the related information identification engine 116-2, in some examples. The process of FIG. 3 includes receiving (at 302) multiple alerts relating to issues in the computing arrangement 100, where the multiple alerts are generated based on events in the computing arrangement 100. The process of FIG. 3 further includes grouping (at 304) a subset of the multiple alerts into a bundle of alerts, where the grouping is based on a grouping criterion.

The process of FIG. 3 further includes identifying (at 306) related information for the bundle of alerts based on a related information identification criterion. The process further includes communicating (at 308) the bundle of alerts and the identified related information to trigger processing of the alerts in the bundle of alerts together.

Figure 4:
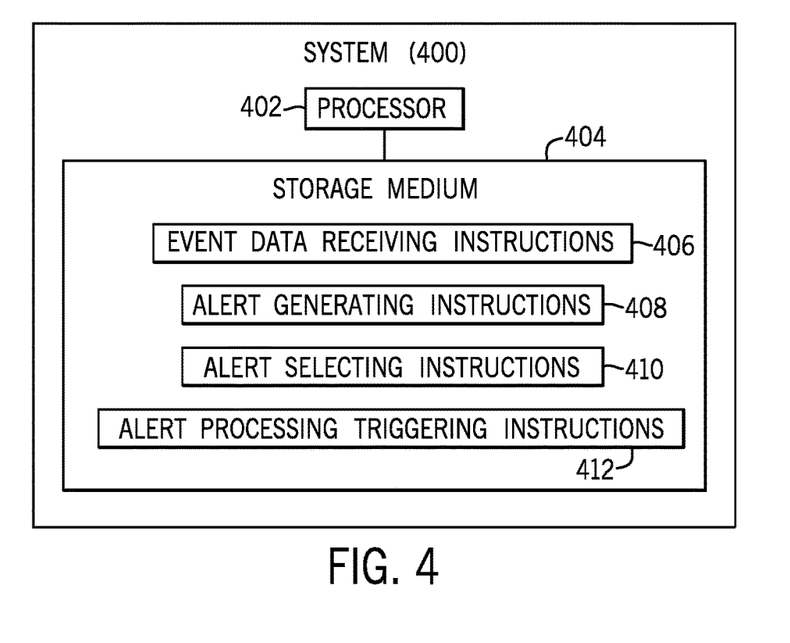
FIG. 4 is a block diagram of a system according to some examples.

FIG. 4 is a block diagram of a system 400 according to further examples. The system can be implemented as a computer or a number of computers. The system 400 includes a processor 402 (or multiple processors). A processor can include a microprocessor, a core of a multi-core microprocessor, a microcontroller, a programmable integrated circuit, a programmable gate array, or another hardware processing circuit.

The system 400 further includes a storage medium 404 that stores machine-readable instructions executable on the processor 402. The storage medium 404 stores event data receiving instructions 406 (such as those of the event data collector 112 in FIG. 1) to receive event data relating to multiple events corresponding to operation of the computing arrangement 100. The storage medium 404 further stores alert generating instructions 408 (such as those of the alert generator 114 in FIG. 1) to generate multiple alerts in response to respective events of the multipole events. The storage medium 404 further stores alert selecting instructions 410 (such as instructions of the alert bundling engine 116-1) to select, based on a similarity criterion, a subset of the multiple alerts, and to group the selected subset of the multiple alerts into a bundle of alerts. The storage medium 404 further stores alert processing triggering instructions 412 to trigger processing of the bundle of alerts to address respective issues in the computing arrangement 100.

The storage medium 200 (FIG. 2) or 404 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   receive a plurality of alerts relating to issues in a computing arrangement, the plurality of alerts generated based on events in the computing arrangement;
   group a subset of the plurality of alerts into a bundle of alerts, the grouping being based on a criterion, wherein grouping the subset of the plurality of alerts into the bundle of alerts based on the criterion comprises grouping the subset of the plurality of alerts according to a comparison of behavioral profiles of respective alerts of the plurality of alerts; and
   trigger processing of the alerts in the bundle of alerts together to address the issues.

2. The non-transitory machine-readable storage medium of claim 1, wherein the comparison of the behavioral profiles of respective alerts of the plurality of alerts comprises comparing profiles of a measure associated with the respective alerts of the plurality of alerts, wherein each profile of the measure includes a variation of values of the measure as a function of a variable.

3. The non-transitory machine-readable storage medium of claim 1, wherein grouping the subset of the plurality of alerts into the bundle of alerts based on the criterion comprises grouping the subset of the plurality of alerts according to a comparison of criticalities of assets impacted by respective alerts of the plurality of alerts.

4. The non-transitory machine-readable storage medium of claim 3, further comprising determining the criticalities of the assets impacted by the respective alerts of the plurality of alerts based upon a rule that specifies a criticality of a given asset responsive to a factor selected from among a role of an owner of the given asset or a type of data stored on the given asset.

5. The non-transitory machine-readable storage medium of claim 1, wherein grouping the subset of the plurality of alerts into the bundle of alerts based on the criterion comprises grouping the subset of the plurality of alerts according to a comparison of analytics modules that generate respective alerts of the plurality of alerts, wherein the comparison of the analytics modules that generate respective alerts of the plurality of alerts comprises comparing rules or policies applied by the analytics modules to generate respective alerts.

6. The non-transitory machine-readable storage medium of claim 1, wherein grouping the subset of the plurality of alerts into the bundle of alerts based on the criterion comprises grouping the subset of the plurality of alerts according to a comparison of indicators of compromise associated with respective alerts of the plurality of alerts, wherein each indicator of compromise includes an artifact indicating compromise of the computing arrangement.

7. The non-transitory machine-readable storage medium of claim 1, wherein grouping the subset of the plurality of alerts into the bundle of alerts based on the criterion comprises grouping the subset of the plurality of alerts based on a determination that the subset of the plurality of alerts affect members of a predefined group.

8. The non-transitory machine-readable storage medium of claim 1, wherein the criterion is selected from among similarity of events associated with respective alerts of the plurality of alerts, similarity of targets affected by respective alerts of the plurality of alerts, similarity sources of respective alerts of the plurality of alerts, similarity of attributes of users affected by or causing respective alerts of the plurality of alerts, similarity of features of features of respective alerts of the plurality of alerts, similarity of timings of respective alerts of the plurality of alerts, and similarity of analyst-defined tags of respective alerts of the plurality of alerts.

9. The non-transitory machine-readable storage medium of claim 1, wherein the instructions upon execution cause the system to further:
   identify related information for the bundle of alerts; and
   communicate the identified related information for the bundle of alerts with the bundle of alerts to trigger processing of the alerts in the bundle of alerts together.

10. A system comprising:
    a processor; and
    a non-transitory storage medium storing instructions executable on the processor to:
      receive event data relating to a plurality of events corresponding to operation of a computing arrangement;
      generate a plurality of alerts in response to respective events of the plurality of events;
      select, based on a similarity criterion, a subset of the plurality of alerts, and grouping the selected subset of the plurality of alerts into a bundle of alerts, wherein the selecting of the subset of the plurality of alerts that is included in the bundle of alerts is based on the similarity criterion comprising similarity of criticalities of assets impacted by the alerts of the plurality of alerts; and
      trigger processing of the bundle of alerts to address respective issues in the computing arrangement.

11. The system of claim 10, wherein the selecting of the subset of the plurality of alerts that are included in the bundle of alerts is based on the similarity criterion comprising: similarity of events associated with respective alerts of the plurality of alerts, similarity of behavioral profiles of respective alerts of the plurality of alerts, and similarity of analytics modules that generate respective alerts of the plurality of alerts.

12. The system of claim 10, wherein the selecting of the subset of the plurality of alerts that are included in the bundle of alerts is based on the similarity criterion specifying that alerts affecting members of a predefined group are to be grouped.

13. A method of a system comprising a computer processor, comprising:
   receiving a plurality of alerts relating to issues in a computing arrangement, the plurality of alerts generated based on events in the computing arrangement;
   grouping a subset of the plurality of alerts into a bundle of alerts, the grouping being based on a grouping criterion that specifies grouping of alerts according to a comparison of behavioral profiles of respective alerts of the plurality of alerts, each behavioral profile of the behavioral profiles comprising a variation of values of a measure as a function of a variable;
   identifying related information for the bundle of alerts based on a related information identification criterion;
   communicating the bundle of alerts and the identified related information for the bundle of alerts; and
   in response to the communicating of the bundle of alerts and the identified related information for the bundle of alerts, triggering processing of the alerts in the bundle of alerts together to address the issues.

14. The method of claim 13, wherein the related information identification criterion is selected from among: a specification of an extent of historical data to search, a type of information to be returned, a feature used to determine similarity of alerts, a type of alert, a criticality of an alert, an asset affected by an alert, a category to which the bundle of alerts belong, and presence of an alert from a security tool.

15. The non-transitory machine-readable storage medium of claim 1, wherein grouping the subset of the plurality of alerts into the bundle of alerts based on the criterion comprises:
   grouping, into the bundle of alerts, a first alert generated responsive to a first set of events, and a second alert generated responsive to a second set of events, responsive to determining that the first set of events and the second set of events share greater than a threshold amount of common events.

16. The non-transitory machine-readable storage medium of claim 15, wherein sharing greater than the threshold amount of common events is satisfied if:
   the first set of events and the second set of events share greater than a threshold number of the common events, or
   the first set of events and the second set of events share greater than a threshold percentage amount of the common events.

17. The non-transitory machine-readable storage medium of claim 2, wherein the variable that the values of the measure are a function of comprises time or location.

18. The non-transitory machine-readable storage medium of claim 2, wherein each behavioral profile of the behavioral profiles comprises variations of values of a plurality of measures as a function of the variable.

19. The system of claim 10, wherein the selecting of the subset of the plurality of alerts that are included in the bundle of alerts is based on the similarity criterion that specifies grouping of alerts according to a comparison of behavioral profiles of respective alerts of the plurality of alerts, each behavioral profile of the behavioral profiles comprising a variation of values of a measure as a function of a variable.

* * * * *